US 8,494,569 B2

(12) United States Patent
Nielsen et al.

(10) Patent No.: US 8,494,569 B2
(45) Date of Patent: *Jul. 23, 2013

(54) SIGNAL DETECTION IN FADING ENVIRONMENTS

(75) Inventors: John Nielsen, Calgary (CA); Gerard Lachapelle, Calgary (CA); Ali Broumandan, Calgary (CA)

(73) Assignee: Her Majesty the Queen in right of Canada, as represented by the Minister of National Defence, Ottawa, Ontario (CA)

(*) Notice: Subject to any disclaimer, the term of this patent is extended or adjusted under 35 U.S.C. 154(b) by 362 days.

This patent is subject to a terminal disclaimer.

(21) Appl. No.: 12/884,360

(22) Filed: Sep. 17, 2010

(65) Prior Publication Data

US 2011/0070857 A1   Mar. 24, 2011

Related U.S. Application Data

(60) Provisional application No. 61/272,385, filed on Sep. 18, 2009.

(51) Int. Cl.
*H04B 15/00* (2006.01)

(52) U.S. Cl.
USPC .......................................... 455/504; 455/65

(58) Field of Classification Search
USPC ............... 455/504, 506, 63.1, 65, 137–139, 455/273, 67.11, 226.1; 375/347
See application file for complete search history.

(56) References Cited

U.S. PATENT DOCUMENTS

| 6,985,107 | B2 | 1/2006 | Andon et al. |
| 7,187,326 | B2 | 3/2007 | Beadle et al. |
| 7,352,721 | B2 | 4/2008 | Kim et al. |
| 7,505,509 | B2 | 3/2009 | Tsutsui |
| 2003/0204380 | A1 | 10/2003 | Dishman et al. |
| 2007/0285315 | A1 | 12/2007 | Davis et al. |
| 2008/0112468 | A1* | 5/2008 | Sheynblat et al. ............ 375/148 |
| 2011/0021167 | A1* | 1/2011 | Shellhammer ............ 455/226.1 |
| 2011/0070840 | A1* | 3/2011 | Nielsen et al. ............ 455/67.11 |
| 2012/0032854 | A1 | 2/2012 | Bull et al. |
| 2012/0201279 | A1* | 8/2012 | Liberti et al. ................ 375/148 |

OTHER PUBLICATIONS

A. Broumandan et al., "Direction of Arrival Estimation of GNSS Signals Based on Synthetic Antenna Array", ION GNSS 2007, Fort Worth, TX, pp. 1-11, Sep. 2007.

T. Pany et al., "Synthetic Phased Array Antenna for Carrier/Code Multipath Mitigation", Proceedings of ENC-GNSS 2008, Toulouse.

(Continued)

*Primary Examiner* — Nguyen Vo
(74) *Attorney, Agent, or Firm* — Brion Raffoul

(57) ABSTRACT

Systems and methods related to the detection of incoming wireless signals. An antenna array is synthesized by having a single antenna, coupled to a receiver, spatially translated along an arbitrary trajectory. As the antenna is being spatially translated, a data processing means samples the incoming signal based on a clock signal provided by a system clock. By sampling the incoming signal at different times at different spatial locations on the arbitrary trajectory, the system acts as a synthetic antenna array. The different samplings of the incoming signal at different times and positions provide signal diversity gain as well as different readings which can be used to detect an incoming signal. The invention is applicable to detecting a wireless communications signal or a GNSS signal under various conditions. The system may include at least one sensor which can provide data for use in calculating data related to the arbitrary trajectory.

9 Claims, 4 Drawing Sheets

OTHER PUBLICATIONS

Y. Jong and M. Herben, "High-resolution angle of arrival Measurement of the mobile radio Channel", IEEE Trans. Antennas Propagat., vol. 47, No. 11, pp. 1677-1687, Nov. 1999.

Y. De Jong, "Measurement and Modeling of Radio wave Propagation in Urban Microcells", PhD Thesis, Department of Electrical Engineering, University of Technology (EUT), Netherlands, 2001.

Kwakkernaat et al., "High-Resolution Angle-of-Arrival Measurements on Physically-Nonstationary Mobile Radio Channels", IEEE Transactions on Antennas and Propagation, vol. 56, No. 8, 2008, pp. 2720-2729.

Stergiopoulos et al., "A New Passive Synthetic Aperture Technique for Towed Arrays", IEEE Journal of Oceanic Engineering, 1992, vol. 17, No. 1, pp. 16-25.

Broumandan et al., "Practical Results of High Resolution AOA Estimation by the Synthetic Array", 2008, IEEE VTC Fall Conference, Calgary, Canada, pp. 21-24.

Broumandan et al., "TOA Estimation Enhancement based on Blind Calibration of Synthetic Arrays", 2008, IEEE VTC Fall Conference, pp. 21-14, Calgary, Canada.

Broumandan et al., "Narrowband Signal Detection in Correlated Rayleigh Fading with a Moving Antenna", 2009 13th International Symposium on Antenna Technology and Applied Electromagnetics and the Canadian Radio Sciences Meeting, 2009, pp. 1-4.

Broumandan et al., "Signal Detection Performance in Indoor Environments with a Synthetic Antenna Array", 2009 13th International Symposium on Antenna Technology and Applied Electromagnetics and the Canadian Radio Sciences Meeting, 2009, pp. 1-4.

S. Choi and D. Shim, "A Novel Adaptive Beamforming algorithm for a smart antenna system in a CDMA mobile communication environment", IEEE Trans. Vehicular. Tech., vol. 49, No. 5, pp. 1793-1806, Sep. 2000.

J. Jones et al., "Theory and Performance of the Pulse Aperture Correlator", Proceedings of ION GPS, 2004.

R. Roy and T. Kailath, "ESPRIT—Estimation of Signal Parameters via Rotational Invariance Techniques", IEEE Transaction on Acoustics, Speech and Signal Processing, vol. 37, No. 7, Jul. 1989.

A. Moghaddam, "Enhanced Cellular Network Positioning Using Space-Time Diversity", MSc Thesis, Department of Geomatics Engineering, The University of Calgary, Calgary, Canada, 2007.

J. Caffery and G. Stuber, "Subscriber Location in CDMA Cellular Network", IEEE Transactions on Vehicular Technology, vol. 47, No. 2, 1998.

A. Swindlehurst and T. Kailath, "A Performance Analysis of Subspace-Based Methods in the Presence of Model Errors, Part I: The MUSIC Algorithm", IEEE Transactions on Signal Processing, vol. 40, No. 7, Jul. 1992.

A. Swindlehurst et al., "Multiple invariance ESPRIT", IEEE Transactions on Signal Processing, vol. 40, No. 4, Apr. 1992.

S. Charndran, "Advances in Direction of Arrival Estimation", Artech House, 2006.

* cited by examiner

SIGNAL DETECTION IN FADING ENVIRONMENTS

The present application claims the benefit of priority of U.S. Provisional Patent Application No. 61/272,385 filed 18 Sep. 2009, which are hereby incorporated by reference.

TECHNICAL FIELD

The present invention relates to wireless communications. More specifically, the present invention relates to methods and systems for detecting an incoming wireless signal under various conditions using one antenna as a synthetic antenna array.

BACKGROUND OF THE INVENTION

The communications revolution of the late 20th and early 21st century has fuelled a need for better, faster, and more useful communications devices. Currently, there is a need for more efficient and more effective methods for determining the parameters of incoming wireless signals. The need is most acute in the wireless communications industry but such technology can also be applied to military uses.

One problem that has arisen in the wireless communications industry is that of multipath fading. In a wireless mobile communication system, signals propagate from the transmitter to the receiver over multiple paths resulting in multipath fading. When there is no line of sight (LOS) path available from the transmitter and an antenna is located in a dense scattering environment (e.g. indoor and urban environments), the multipath fading appears to be spatially random conforming to Rayleigh statistics. A characteristic of multipath fading is fluctuations in received signal strength as a function of spatial dimensions. This results in signal reception problems for a stationary antenna. The use of multiple antennas can alleviate the spatial fading problem to some degree by providing a means of diversity gain. Recently, attention has been paid to the detection performance of the antenna in Rayleigh fading channel. While the antenna arrays can be implemented in either the base station (BS) or the mobile station (MS), the mobile station implementation is more effective as it is typically subjected to more multipath than the BS. Unfortunately, the physical size of antenna array necessary for achieving a reasonable diversity gain is several carrier wavelengths, which is incompatible with the small form factors of typical handheld receiver devices.

A similar problem regarding the physical size of antenna arrays has been encountered in GNSS (Global Navigation Satellite System) signal reception.

In a typical GNSS propagation scenario, a signal travels from a satellite to a receiver over multiple reflective paths, referred to as multipath propagation. The effect can cause fluctuations in the received signal's amplitude, phase and apparent angle of arrival, a consequence of which is spatial and temporal multipath fading. The multipath scattering nature of the propagation medium causes the received power level to fluctuate when the receiver antenna moves as little as half the wavelength of the GNSS signal. Hence, acquiring the signal in fading channels becomes a challenging problem. Using multiple antennas that exploit the spatial dimension of indoor wireless systems has resulted in significant improvements in detectability and reliability improvements. The multiple antennas are used either in the form of antenna arrays for beamforming or in the form of antenna diversity. Recently, beamforming and interference mitigation of GNSS signals have been an active research area for military and precise positioning applications.

Unfortunately, as noted above with the mobile wireless communications system, the size and shape of antenna arrays limit the applicability of exploiting this antenna diversity approach in many portable devices such as handheld GNSS receivers.

Based on the above, there is therefore a need, both in the mobile communications industry and in the GNSS field, for solutions that would avoid the size problems of antenna arrays while providing the antenna diversity that such a system provides.

It should be noted that the above fields are populated with research into this particular problem. Some of these efforts are listed below. It should be noted that all of the references below are hereby incorporated by reference.

J. D. Parsons, The Mobile Radio Propagation Channel, John Wiley & Sons LTD, 2nd ed. 2000.

C. V. Rensburg, and B. Friedlander, Transmit Diversity for Arrays in Correlated Rayleigh Fading, IEEE Trans. Vehicular Tech., Vol. 53, No. 6, pp. 1726-1734, November 2004.

C. V. Rensburg, and B. Friedlander, The Performance of a Null-Steering Beamforming in Correlated Rayleigh Fading, IEEE Trans. Signal Processing, Vol. 52, Bo. 11, pp. 3117-3125, November 2004.

J. S. Colburn, Y. Rahmat-Samii, M. A. Jensen, and G. J. Pottie, Evaluation of Personal Communications Dual-Antenna Handset Diversity Performance, IEEE Trans. Vehicular Tech., Vol. 47, pp. 737-744, August 1998.

C. Caini, G. E. Corazza and A. Vanelli-Coralli, DS-CDMA Code Acquisition in the Presence of Correlated Fading-Part I: Theoretical Aspects, IEEE Trans. Communications, Vol. 52, No. 7, pp. 1160-1167, July 2004.

C. Caini, G. E. Corazza and A. Vanelli-Coralli, DS-CDMA Code Acquisition in the Presence of Correlated Fading-Part II: Application to Cellular Networks, IEEE Trans. Communications, Vol. 52, No. 8, pp. 1397-1407, August 2004.

S. Kim, Acquisition Performance of CDMA Systems with Multiple Antennas, IEEE Trans. Vehicular Tech., Vol. 53, No. 5, pp. 1341-1353, September 2004.

B. Friedlander and S. Scherzer, Beamforming Versus Transmit Diversity in the Downlink of a Cellular Communications Systems, IEEE Trans. Vehicular Tech., Vol. 53, No. 4, pp. 1023-1034, July 2004.

S. Stergiopoulos and H. Urban, A new passive synthetic aperture technique for towed arrays, IEEE Journal of Oceanic Eng., Vol. 17, No. 1, pp. 16-25, January 1992.

A. Broumandan, T. Lin, A. Moghaddam, D. Lu, J. Nielsen and G. Lachapelle, Direction of Arrival Estimation of GNSS Signals Based on Synthetic Antenna Array, Proceedings of ION GNSS, Fort Worth, Tex., 25-28 Sep. 2007.

S. Hyeon, Y. Yun, H. Kim and S. Choi, Phase Diversity for an Antenna-Array System with a Short Interelement Separation, IEEE Trans. Vehicular Tech., Vol. 57, No. 1, pp. 206-214, January 2008.

Y. Wang and J. R. Cruz, Performance Enhancement of CDMA Cellular Systems with Augmented Antenna Arrays, IEEE J. Select. Areas Commun., Vol. 19, pp. 1052-1060, June 2001.

O. Shin and K. B. Lee, Use of Multiple Antennas for DS/CDMA Code Acquisition, IEEE Trans. Wireless Communication, Vol. 2, No. 3, pp. 424-430, May 2003.

S. Choi and D. Shim, A Novel Adaptive Beamforming Algorithm for a Smart Antenna System in a CDMA Mobile Communication Environment', IEEE Trans. Vehicular. Tech., Vol. 49, No. 5, pp. 1793-1806, September 2000.

H. L. V. Trees, Detection, Estimation, and Modulation Theory, part I, John Wiley & Sons, Inc., New York, 2001.

H. L. V. Trees, Optimum Array Processing, part IV, Detection, Estimation, and Modulation Theory, John Wiley & Sons, Inc., New York, 2002.

S. M. Kay, Fundamentals of Statistical Signal Processing Detection Theory, Prentice-Hall, Inc, 1998.

J. Liberti and T. S. Rappaport, Smart Antennas for Wireless Communications: IS-95 and Third Generation CDMA Applications, Prentice Hall, 1999.

E. D. Kaplan, and C. Hegarty, Understanding GPS Principles and Applications, 2nd ed., Artech House 2006.

O. Shin, and K. B. Lee, "Use of Multiple Antennas for DS/CDMA Code Acquisition," IEEE Trans. Wireless Communication, Vol. 2, No. 3, pp. 424-430, May 2003.

S. Hyeon, Y. Yun, H. Kim, and S. Choi, "Phase Diversity for an Antenna-Array System with a Short Interelement Separation," IEEE Trans. Vehicular Tech., Vol. 57, No. 1, pp. 206-214, January 2008.

G. Seco-Granados, A. Fernandez-Rubio and C. Fernandez-Prades, "ML Estimator and Hybrid Beamforming for Multipath and Interference Mitigation in GNSS Receivers," IEEE Trans. Signal Processing, Vol. 53, No. 3 pp. 1194-1208 March 2005.

A. Brown and N. Gerein, "Test Results of a Digital Beamforming GPS Receiver in a Jamming Environment," Proceedings of ION GPS, Salt Lake City, September, 2001.

Z. Fu, A. Hornbostel, and A. Konovaltsev "Suppression of Multipath and Jamming Signals by Digital Beamforming for GPS/Galileo Applicaions," GPS Solutions, pp. 257-264, 2003.

Y. L. Jong, and M. Herben, "High-resolution Angle of Arrival Measurement of the Mobile Radio Channel," IEEE Trans. Antennas Propagat., Vol. 47, No. 11, pp. 1677-1687, November 1999

S. Khalesehosseini, and J. Nielsen, "Generalized CRLB for DA and NDA Synchronization of UWB Signals with Clock Offset," Proceedings of ICC 2007, Glasgow, Scotland, pp. 4305-4310.

Y. Chen, and N. C. Beaulieu "CRLBs for NDA ML Estimation of UWB Channels," IEEE Communication Letters, vol. 9. no. 8, pp. 709-711, August 2005.

T. S. Rappaport, Wireless Communications: Principles and Practice, Prentice Hall PTR, 2nd Edition, 2002.

B. Zheng, G. Lachapelle "GPS Software Receiver Enhancements for Indoor Use," ION GNSS, 18th International Technical Meeting of the Satellite Division, Long Beach, Calif., 2005.

T. L. Fulghum, K. J. Molnar, and A. Duel-Hallen, "The Jakes Fading Model for Antenna Arrays Incorporating Azimuth Spread," IEEE Trans. Vehicular Tech., Vol. 51, No. 5, pp. 968-977, September 2002.

W. C. Jakes, Microwave Mobile Communications. 2nd ed. Piscataway, N.J.: Wiley-IEEE Press 1974.

SUMMARY OF INVENTION

The present invention provides systems and methods related to the detection of incoming wireless signals. An antenna array is synthesized by having a single antenna, coupled to a receiver, spatially translated along an arbitrary trajectory. As the antenna is being spatially translated, a data processing means samples the incoming signal based on a clock signal provided by a system clock. By sampling the incoming signal at different times at different spatial locations on the arbitrary trajectory, the system acts as a synthetic antenna array. The different samplings of the incoming signal at different times and positions provide signal diversity gain as well as different readings which can be used to detect an incoming signal. The invention is applicable to detecting a wireless communications signal or a GNSS signal under various conditions. The system may include at least one sensor which can provide data for use in calculating data related to the arbitrary trajectory.

In a first aspect, the present invention provides a system for determining a presence or absence of an incoming wireless signal, the system comprising:
 at least one antenna
 a clock for providing a clock signal
 data processing means
 wherein
 said at least one antenna is spatially translated in an arbitrary trajectory
 said data processing means samples data from said incoming signal at intervals based on said clock signal as said at least one antenna is spatially translated through said arbitrary trajectory
 said data processing means determines a presence or an absence of said incoming signal based on said samples.

In a second aspect, the present invention provides a method for detecting an incoming wireless signal, the method comprising:
 determining an environment in which a signal detection system is to operate in;
 in the event said environment is an uncorrelated multipath environment, processing signal samples of said incoming signal using an Equal Gain (EG) combiner;
 in the event said environment is a correlated signal environment, processing signal samples of said incoming signal using an Estimator-Correlator (EC) formulation.

BRIEF DESCRIPTION OF THE DRAWINGS

The invention will be described with reference to the accompanying drawings, wherein.

DETAILED DESCRIPTION OF THE INVENTION

Figure 1:
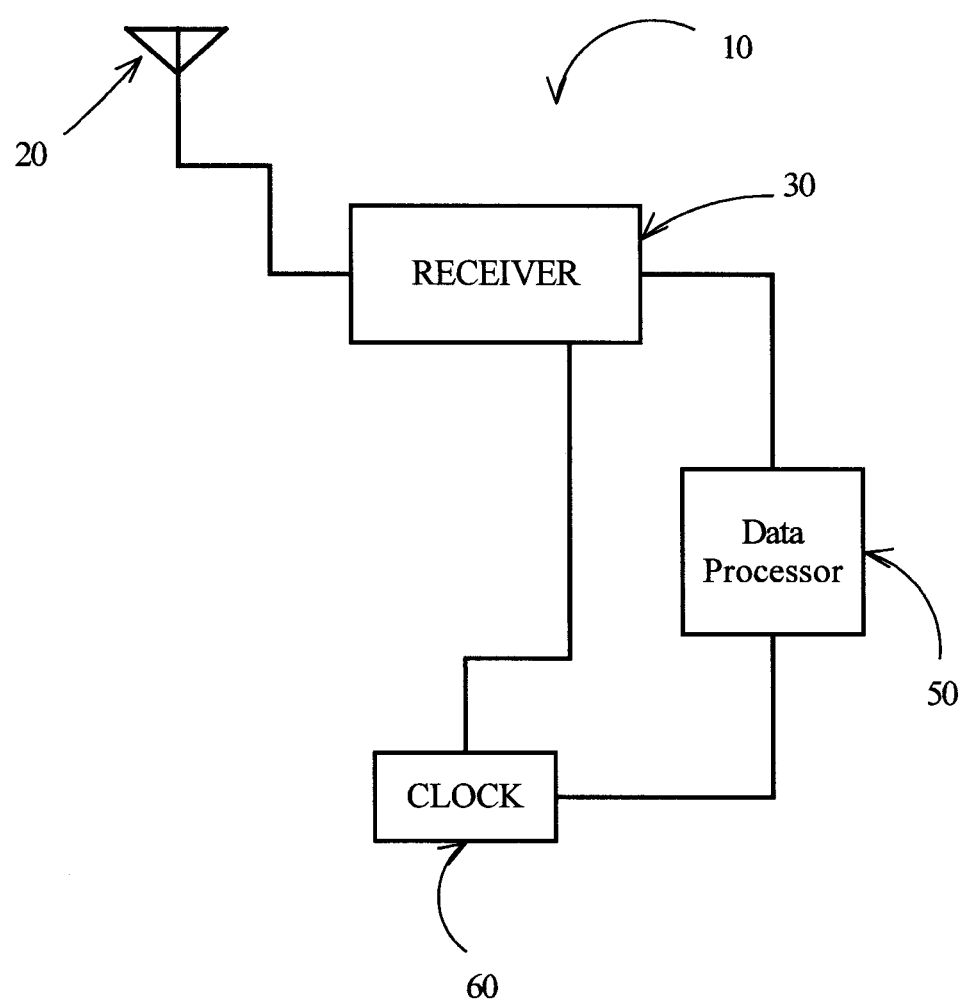
FIG. 1 is a a block diagram of the system according to one aspect of the invention.

Referring to FIG. 1, a block diagram of the system 10 is illustrated. As can be seen, the antenna 20 is coupled to a receiver 30. The receiver 30 is coupled to a data processing means 50. A clock 60 provides an internal clock signal to the receiver 30 and the data processing means 50. The antenna 20 is spatially translated in an arbitrary (and possibly random) trajectory. As the antenna traverses the trajectory, the data processing means, through the receiver, samples an incoming signal at specific intervals. Whether an interval has passed or not is determined by the clock signal from the clock.

Figure 1A:
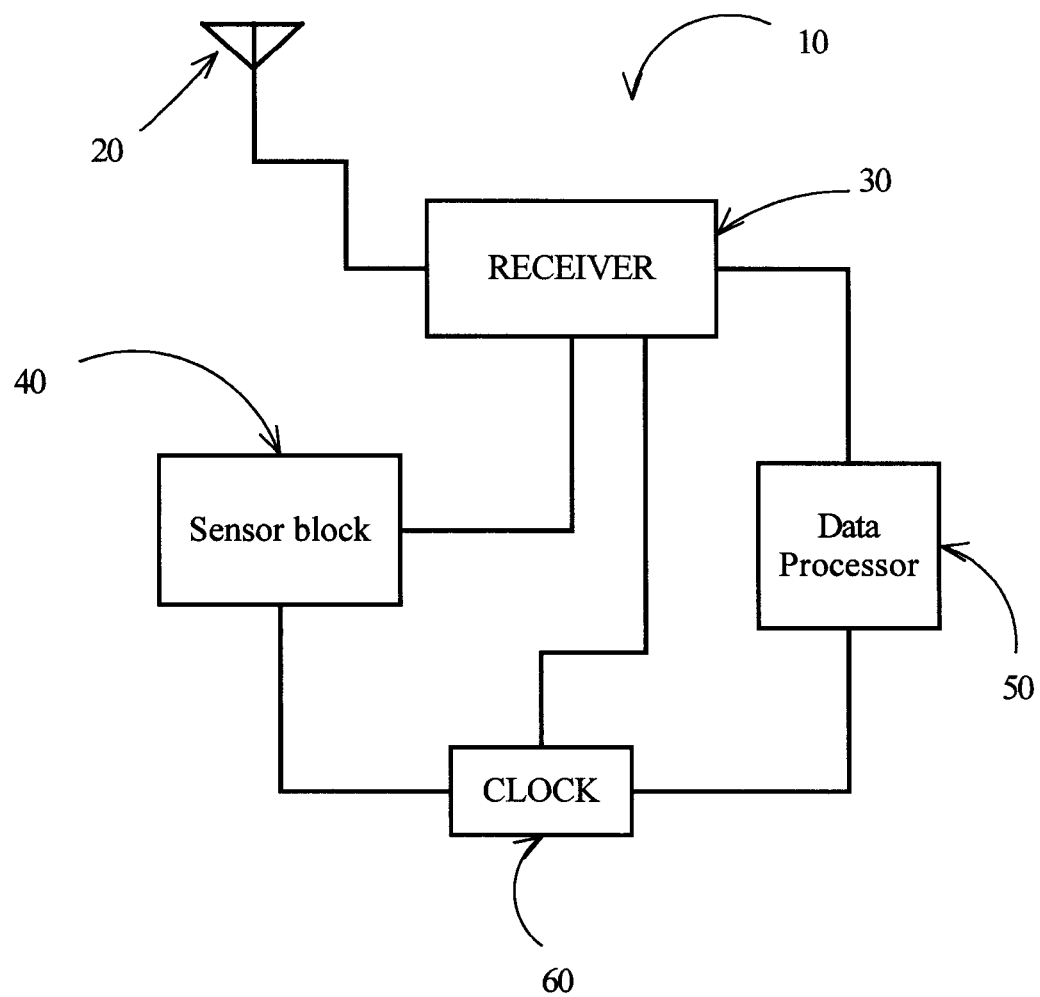
FIG. 1A is a block diagram of a variant of the system illustrated in FIG. 1.

The system may also have a sensor block 40 coupled to both the clock 60 and the receiver 30 (see FIG. 1A). The sensor block 40 contains sensors that can provide data regarding the trajectory to the data processing means if the calculations performed by the data processing means requires it. It should be noted that while FIG. 1 shows a single antenna/receiver pair, a doublet or two antennas/receiver pair may also be used as well as other configurations.

Regarding the system, it is essentially a synthetic antenna array. A synthetic array generally implies a single antenna that is physically translated in space over an aperture interval. The signal collected at the output of this antenna during the interval that it is translated is used in the subsequent signal processor.

The synthetic array concept being used in the invention is where a single antenna is swept through a spatial trajectory that is arbitrary and random. Usually the trajectory would be generated by a user sweeping his hand through a smooth arc. However, the trajectory could also be less deliberate motion with the antenna attached to the user's helmet or clothing in some way. It should be noted that the system could be deployed in a handheld form factor with the handset being swept through some smooth trajectory. Alternatively, the system could be deployed in a vehicle or some other equally moving platform or the system could be co-located with the user in a moving vehicle or platform.

The sampling of the incoming signal may be performed continuously for short bursts for discrete amounts of time. In one implementation, the signal is despread or processed to obtain samples of the channel gain for the specific signal. In another implementation, the signal is sampled continuouslyas the antenna is moved without interruption.

The system could use senors or a set of devices used for estimating data related to the trajectory. These could be inexpensive MEMS type accelerometers and rate gyros. Other sensors or sensor types may also be used.

Also associated with the system is a free running clock typically based on an ovenized crystal oscillator. The oscillator cannot be locked to any reference as the carrier phase of the moving antenna is measured with respect to the phase of this oscillator.

Figure 2:
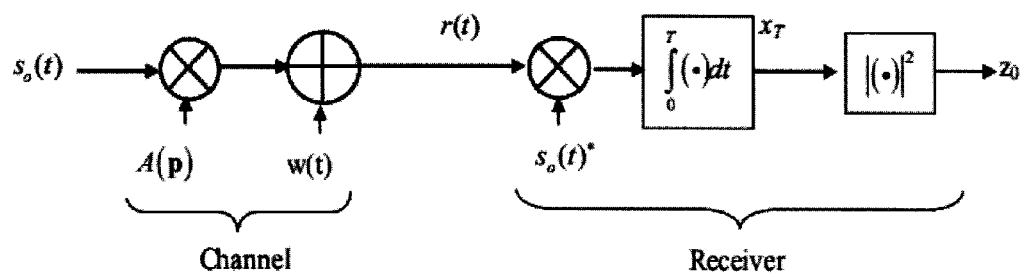
FIG. 2 illustrates the optimal Neyman Pearson (NP) detection processing.

For the detection of wireless communications signals, the calculations and the formulation of the relevant equations are as follows:

Consider r(t) as a complex baseband signal received by a single antenna, which is processed to decode between two states, $H_0$, where only noise is present, and $H_1$ where both signal and noise are present. The conditional representations of r(t) for a stationary antenna located at position p is $$r(t)|_{H1} = A(p)s_o(t) + w(t)$$
$$r(t)|_{H0} = w(t) \quad (1)$$

where $s_o(t)$ is the deterministic (pilot) complex baseband component of the signal that is known to the receiver and A(p) is the channel gain as a function, of spatial position. The channel gain is assumed to be temporally static during the time interval that the data is collected. However, the channel gain varies randomly with the spatial variable p according to the assumed Rayleigh fading. Hence A(p) is assumed to be a zero mean circular normal random variable such that $A(p) \sim CN(0, \delta^2_A)$ where ~ denotes the PDF (probability density function) of the left hand side variable and $CN(0, \delta^2)$ signifies a zero mean circular normal PDF with variance $\delta^2$. The received signal is corrupted with additive noise denoted by w(t), which is assumed to be circularly normal and spectrally white within the signal bandwidth of $s_o(t)$ with a double sided power spectral density of $N_o/2$. The stationary antenna receiver accumulates a temporal snapshot of r(t) over the snapshot interval of t∈[0,T]. Based on these assumptions, the optimal Neyman Pearson (NP) detection processing is a matched filter based on correlation with $s_o(t)$* followed by a magnitude squared operation, as illustrated in FIG. 2.

This processing results in the decision variable denoted as $z_0$ which is expressed as $$z_0 = \left| \int_0^T r(t)s_o(t)^* dt \right| = |x_T|^2 \quad (2)$$

where $$x_T = \int_0^T r(t)s_o(t)^* dt.$$

For convenience, the signal energy $s_o(t)$ is normalized as $$\frac{1}{T} \int_0^T |s_o(t)|^2 dt = 1.$$

The noise at the output of the processor is circularly normal as $$\int_0^T w(t)s_o(t)^* dt \sim CN(0, TN_o).$$

Based on this is it convenience to define p as the average signal to noise ratio as $$\rho \equiv \frac{T\sigma^2_A}{N_o} \quad (3)$$

This definition, unless otherwise noted, will be used throughout this document. Without loss of generality, the normalization of $TN_0 = 1$ can be imposed such that $\rho = T^2\delta^2_A$ which simplifies the expressions to follow. Based on the above definitions and normalizations, the PDF of $x_T$ conditioned on $H_0$ and $H_1$ is $$x_T \sim \begin{cases} CN(0, 1) & \text{under } H0 \\ CN(0, 1+\rho) & \text{under } H1 \end{cases} \quad (4)$$

Consequently, the PDF of $z_0$ conditioned on $H_0$ and $H_1$ is Chi-Squared central with two degrees of freedom (DOF). Hence $$z_0 \sim \begin{cases} e^{-z_0} & \text{under } H0 \\ \frac{1}{\rho+1} e^{-\frac{z_0}{\rho+1}} & \text{under } H1 \end{cases} \quad (5)$$

Assuming that $z_0$ is compared with a threshold γ then the $P_{fa}$ (probability of a false alarm) and $P_d$ (probability of a good detection) can be determined by $$P_{fa} = \exp(-\gamma) \quad (6)$$

$$P_d = \exp\left(\frac{-\gamma}{1+\rho}\right)$$

Let $\rho_s$ denote the value of $\rho$ for the stationary antenna which can be expressed explicitly in terms of the given target values of $P_{fa}$ and $P_d$ using equation (6) as $$\rho_s = \frac{\ln(P_{fa})}{\ln(P_d)} - 1 \quad (7)$$

$\rho_s$ is the average SNR required to meet the target values of $P_{fa}$ and $P_d$ for a stationary antenna assuming Rayleigh fading.

Figure 3:
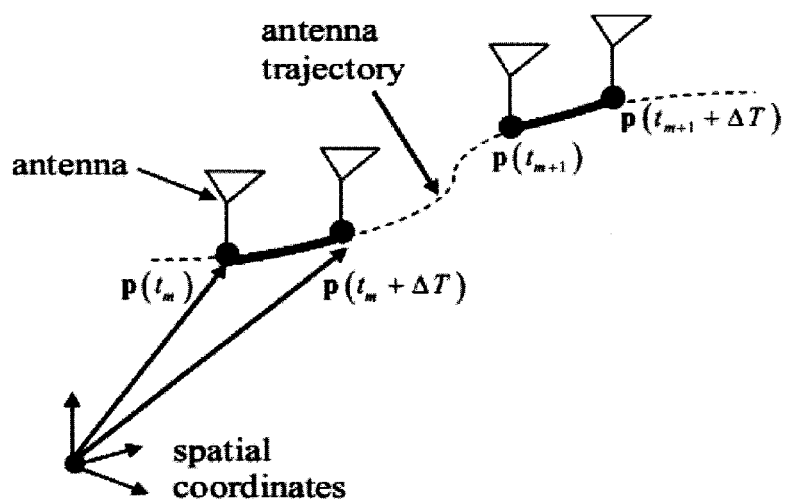
FIG. 3 illustrates the synthetic array antenna with an arbitrary trajectory.

To model the synthetic array system, one must consider the case where the single antenna is moving along an arbitrary trajectory while the snapshot data is being collected. The position vector to the antenna location at time t from the origin is now denoted as p(t). The signal component of the complex baseband signal r(t) is written as s(t,p(t)), which is a function of time, t and the antenna position, p(t) which in turn is a function of t. The signal is assumed to be narrowband implying that the maximum spatial extent of the antenna trajectory is much smaller than the wavelength corresponding to the highest frequency component of the complex envelope of $s_o(t)$. FIG. 3 illustrates the synthetic array antenna with an arbitrary trajectory. During the antenna movement, the receiver collects M spatial samples, each with coherent integration intervals of $\Delta T$. Note that the M spatial samples are taken sequentially.

The narrowband assumption justifies the decomposition of $s(t,p(t)=A(p(t)s_o(t)$, which implies that the small delay changes due to p(t) are insignificant in the context of $s_o(t)$. It is assumed that the signal snapshot of r(t) is collected in M subintervals each of duration $\Delta T$. The constraint $T=M \Delta T$ is imposed such that the stationary antenna and synthetic array antenna can be compared directly. Define $t_m$ as the starting instance of the $m^{th}$ subinterval that extends over the interval of $[t_m, t_m+\Delta T]$ for m$\in$[1, 2, ..., M]. It is assumed that there can be arbitrary time gaps between the subintervals such that $t_m - t_{m+1} > \Delta T$. The collection of signal over the $m^{th}$ and $(m+1)^{th}$ subintervals is illustrated in FIG. 3.

As stated earlier, $\Delta T$ is considered to be sufficiently small such that A(p(t)) can be approximated as constant over the sub-interval of $\Delta T$. The signal captured in each subinterval is correlated with $s_o(t)$ resulting in a set of M spatial array samples denoted by $x_m$ and given as $$x_m = \int_{t_m}^{t_m+\Delta T} r(t)s_o(t)^* dt \quad (8)$$

$x_m$ is expressed as $$x_m = A(p(t_m))s_m + w_m \quad (9)$$

where $$s_m = \int_{t_m}^{t_m+\Delta T} |s_o(t)|^2 dt \quad (10)$$

-continued $$w_m = \int_{t_m}^{t_m+\Delta T} w(t)s_o(t)^* dt$$

Based on these assumptions, it follows that $x_m$ forms an approximate set of sufficient statistics of the accumulated snapshot signal in terms of optimal decoding between $H_0$ and $H_1$. The vector forms of the signals are written as $x=[x_1, \ldots, x_M]^T$, $s=[s_1, \ldots, s_M]^T$, $w=[w_1, \ldots, w_M]^T$ and $A=[A(p(t_1)), \ldots, A(p(t_M))]^T$. With these definitions the detection problem is stated as $$x|H_0 = w$$

$$x|H_1 = A \odot s + w$$

where $\odot$ denotes the Hadamard vector product operator. The noise covariance matrix is denoted as $C_w$ and given as $$C_w = E[ww^H] = \frac{1}{M}I_M \quad (12)$$

where $I_M$ is an M×M identity matrix. The last step follows from the normalization $TN_0=1$ and that $$\int_{t_m}^{t_m+\Delta T} |s_o(t)|^2 dt \approx \frac{T}{M} = \Delta T$$

which is based on the assumption that the bandwidth of the spreading signal $s_o(t)$ is much larger than $1/\Delta T$. The signal covariance matrix is denoted as $C_s$ and given as $$C_s = E[A \odot s(A \odot s)^H] = \Delta T^2 C_A \quad (13)$$

where $C_A$ is the covariance matrix of A. As stated previously, the individual components of the vector A are circularly normal such that $[A]_m = A(p(t_m)) \sim CN(0, \delta^2_A)$. Assuming that the arbitrary antenna trajectory is known, then the components of A are jointly circularly normal. The signal covariance matrix in a Rayleigh fading environment with the ring of scatterers models can be defined as $$C_s \approx \frac{\sigma_A^2 T^2}{M^2}\Psi = \frac{\rho}{M^2}\Psi \quad (14)$$

$$[\Psi]_{i,j} = J_0(2\pi|p_i - p_j|/\lambda)$$

where $\Psi$ shows the normalized correlation coefficient matrix which is a function of antenna spacing and scatterer's angular spread and $J_0$ is zero-order Bessel function of the first kind. Thus, the PDF of x conditioned on $H_0$ and $H_1$ is $$x \sim \begin{cases} CN(0, \sigma^2 I) = CN\left(0, \frac{I}{M}\right) & \text{under } H_0 \\ CN(0, C_s + \sigma^2 I) = CN\left(0, \frac{\rho}{M^2}\Psi + \frac{I}{M}\right) & \text{under } H_1 \end{cases} \quad (15)$$

The optimal detection processing based on the NP log likelihood Ratio Test (LRT) chooses $H_1$ if $$L(x) = \frac{p(x|H_1)}{p(x|H_0)} > \gamma \qquad (16)$$

where $p(x|_{H1})$ and $p(x|_{H0})$ are the conditional PDF's of x given $H_1$ and $H_0$, respectively. Since both A and w are zero mean multivariate Gaussian random vectors, so is x. Hence L(x) is a function of the covariance matrices of A⊙s and w.

After some manipulations and removing deterministic scaling and additive constants, the LRT reduces to the Estimator-Correlator (EC) formulation resulting in the following single sufficient statistic given as $$z_{EC}(x) = x^H C_s (C_s + \sigma^2 I)^{-1} x \qquad (17)$$

where $\delta^2$ and $C_s$ are defined in equation (15). Since $C_s$ is a Hermitian matrix, the eigen-decomposition of $C_s$ can be represented as $$V^H C_s V = A_s \qquad (18)$$

where $V = [v_1\ v_2\ v_3\ \ldots\ v_M]$ is the orthogonal matrix of columnwise eigenvectors and $A_s$ is the diagonal matrix of eigenvalues where the $m^{th}$ eigenvalue is denoted by $\lambda_{sm}$. The test statistics in (17) can be shown as $$\dot{z}_{EC}(y) = \sum_{m=1}^{M} \frac{\lambda_{s_m}}{\lambda_{s_m} + \sigma^2} |y_m|^2 \qquad (19)$$

where $y = V^H \cdot x$. The vector $y = [y_1, y_2, \ldots, y_M]^T$ consists of M independent circular Gaussian random variables such that $$y \sim \begin{cases} CN\left(0, \frac{I}{M}\right) & \text{under } H0 \\ CN\left(0, A_s + \frac{I}{M}\right) & \text{under } H1 \end{cases} \qquad (20)$$

Figure 4:
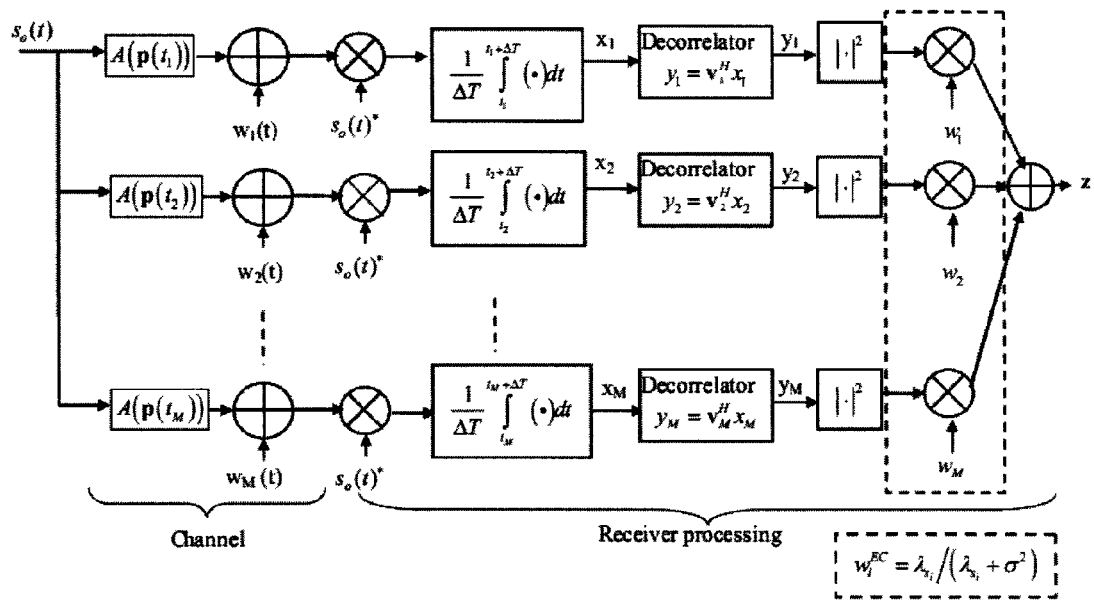
FIG. 4 illustrates the synthetic antenna processing model and the canonical form of Estimator-Correlator formulation.

Therefore, the test statistics, $z_{EC}$ becomes a scaled factor of Chi-Squared distribution. FIG. 4 shows the synthetic antenna processing model and the canonical form of EC.

Next consider the calculation of the $P_{fa}$ and $P_d$. The characteristic function of $z_{EC}$ conditioned on $H_0$ and $H_1$ is given as $$\phi_{z|H_i}(\omega) = \prod_{m=1}^{M} \frac{1}{1 - j\alpha_m^{H_i} \omega} \quad i = 0, 1 \qquad (21)$$

where $$\alpha_m^{H_0} = \frac{\lambda_{s,m}}{M\lambda_{s,m} + 1} \qquad (22)$$

$$\alpha_m^{H_1} = \lambda_{s,m}$$

The values of $P_{fa}$ and $P_d$ can be determined by taking the Fourier transform of the characteristic functions. For a given threshold of $\gamma$ applied to $z_{EC}$, the following is obtained:

$$P_{fa} = \int_\gamma^\infty \int_{-\infty}^\infty \phi_{z|H0}(\omega) e^{-j\omega z} \frac{d\omega}{2\pi} dz \qquad (23)$$

$$P_d = \int_\gamma^\infty \int_{-\infty}^\infty \phi_{z|H1}(\omega) e^{-j\omega z} \frac{d\omega}{2\pi} dz$$

To determine a closed form expression for $P_{fa}$ and $P_d$ in case of distinctive eigenvalues of $C_s$, using a partial fraction expansion, it can be shown that $$\prod_{m=1}^{M} \frac{1}{1 - j\alpha_m^{H_i}\omega} = \sum_{m=1}^{M} \frac{A_m^{H_i}}{1 - j\alpha_m^{H_i}\omega} \quad i = 0, 1 \qquad (24)$$

where $$A_m^{H_i} = \prod_{\substack{k=1 \\ k \neq m}}^{M} \frac{1}{1 - \frac{\alpha_k^{H_i}}{\alpha_m^{H_i}}} \quad i = 0, 1 \qquad (25)$$

For the general case of $$z = \sum_{m=1}^{M} \alpha_m^{H_i} x_m^2$$

where $\alpha_m^{H_i}$ are distinct with $\alpha_m^{H_i} > 0$ are IID with PDF of Chi-Squared with two DOF, the PDF of z is given by $$P_z(z) = \int_{-\infty}^{\infty} \prod_{m=1}^{M} \frac{1}{1 - j\alpha_m^{H_i}\omega} e^{-j\omega z} \frac{d\omega}{2\pi} dz \qquad (26)$$

$$= \begin{cases} \sum_{m=1}^{M} \frac{A_m^{H_i}}{\alpha_m^{H_i}} e^{-\frac{z}{\alpha_m^{H_i}}} & z > 0 \\ 0 & z < 0 \end{cases}$$

Thus the performance of EC can be represented in closed form as $$P_{fa} = \sum_{m=1}^{M} A_m^{H_0} \exp\left(\frac{-\gamma}{\alpha_m^{H_0}}\right) \qquad (27)$$

$$P_d = \sum_{m=1}^{M} A_m^{H_1} \exp\left(\frac{-\gamma}{\alpha_m^{H_1}}\right)$$

where $\alpha_m^{H_i}$ is defined in equation (22).

Regarding the Equal Gain combiner, it has been shown in equation (19) that the EC emphasizes the stronger signal components corresponding to those with the larger eigenvalues. The EC formulation requires approximate knowledge of signal and noise covariance matrices in order to compute the eigenvalues. This may not be applicable in many practical applications. When $C_w$ and $C_s$ are not available, the Equal Gain (EG) combiner is a practical suboptimal alternative that may be applied. Note from equation (19) that the EG becomes asymptotically optimal when the signal becomes more uncorrelated. On the other hand, EG combiner is an optimal approach for Gaussian signal detection in uncorrelated multipath environments. This is because the term $\lambda_{s_m}/(\lambda_{s_m}+\sigma^1)$ in equation (19) becomes identical for all spatial samples that lead to the EG formulation. The test statistics of EG combiner can be represented by $$z_{EG} = x^H x = \sum_{m=1}^{M} |x_m|^2 \qquad (28)$$

As it is shown in equation (28), the test statistics of EG combiner is independent of $C_s$. To determine the performance of EG in correlated Rayleigh fading, it is convenient to perform the following transformation which decorrelates the signal covariance matrix:

$$\begin{aligned} z_{EG} &= x^H x \\ &= x^H V V^H x \\ &= y^H y \\ &= \sum_{m=1}^{M} |y_m|^2 \end{aligned} \qquad (29)$$

with $y=V^H x$. The distribution of y is given in equation (20). Consequently, $$y_m \sim CN(0, \lambda_m^{H_i}) \quad i = 1, 2 \qquad (30)$$
$$|y_m|^2 \sim \frac{1}{\lambda_m^{H_1}} \chi_2^2\left(\frac{z}{\lambda_m^{H_i}}\right)$$

where $\lambda_m^{H_i}$ is the $m^{th}$ eigenvalue of $C_s$ under $H_i$ state and $\chi_2^2$ denotes Chi-Squared distribution with two DOF. For a general signal covariance matrix $C_s$, the characteristic function of $z_{EG}$ conditioned on $H_i$ is given as $$\phi_{z_i H_i}(\omega) = \prod_{m=1}^{M} \frac{1}{1 - j\lambda_m^{H_i}\omega} \quad i = 0, 1 \qquad (31)$$

where $$\lambda_m^{H_0} = \frac{1}{M} \qquad (32)$$
$$\lambda_m^{H_1} = \lambda_{S_m} + \frac{1}{M}$$

The values of $P_{fa}$ and $P_d$ can be determined by equation (23). In the case of distinctive eigenvalues of $C_s$, a closed form expression of the performance of EG can be written as $$P_{fa} = \sum_{m=1}^{M} A_m^{H_0} \exp\left(\frac{-\gamma}{\lambda_m^{H_0}}\right) \qquad (33)$$
$$P_d = \sum_{m=1}^{M} A_m^{H_1} \exp\left(\frac{-\gamma}{\lambda_m^{H_1}}\right)$$

where $$A_m^{H_i} = \prod_{\substack{k=1 \\ k \neq m}}^{M} \frac{1}{1 - \frac{\lambda_k^{H_i}}{\lambda_m^{H_i}}} \quad i = 1, 2 \qquad (34)$$

From all of the above, we can see that the optimum detector for a signal in Gaussian noise is the EC, the test statistic for this being given in equation (19). This procedure, however, requires knowledge of the covariance matrix and the signal power. The EC performances were shown in equation (23). The closed form expressions for $P_{fa}$ and $P_d$ are given in equation (27). A condition for applying equation (27) is that the eigenvalues $\lambda_{s,m}$ are distinct.

It can also be seen that when the multipath fading is such that the channel gains associated with the M samples of the synthetic array become uncorrelated then the EC reduces to an EG combiner. In this case, the test statistic becomes a random variable with a central Chi-squared PDF with 2M DOF where M is the number of samples.

Another suggestion from the above is that when the multipath fading is such that the channel gains associated with the M samples of the synthetic array become fully correlated, then the EC combining reduces to that of a matched filter followed by a magnitude squaring operation. In this case, the test statistic is random with a central Chi-square PDF of two DOF. The test statistic and performance are therefore equivalent to that of the stationary antenna as represented in equations (2) and (6).

Given the performance of EC and what it requires, when $C_s$ and $C_w$ are unknown, a suboptimal solution is the EG combiner. The performances of EG combiner in correlated Rayleigh fading were shown in equation (33).

It should be noted that the above calculations and suggested solutions are for correlated environments. For uncorrelated Rayleigh fading environments, the corresponding analysis is identical to the above analysis up to equation (13). From this point on, the analysis diverges.

For convenience, equation (13) is reproduced below as equation (35)

$$C_s = E[A \odot s(A \odot s)^H] = \Delta T^2 C_A \qquad (35)$$

where $C_s$ is the signal covariance matrix and $C_A$ is the covariance matrix of A.

If we resume the analysis from equation (35) on, if we assume that the trajectory is arbitrary then A is multivariate complex normal. A common model for describing the multipath spatial decorrelation is based on a uniformly distributed ring of scattering points. The resulting covariance matrix based on this assumption is $$\begin{aligned}[] [C_A]_{i,j} &= E[A(p(t_i))A^*(p(t_j))] \\ &= \sigma_A^2 J_0(k_0|p(t_i) - p(t_j)|) \end{aligned} \qquad (36)$$

where $k_0$ is wave number corresponding to the carrier of the signal and $J_0$ is the zero order Bessel function of the first kind. Other multipath scattering models may be more applicable for specific scenarios notably if the multipath scattering points are in a sphere or a solid angle sector of a sphere. Note that if the subinterval sample points are sufficiently far apart such that $|p(t_i)-p(t_j)|$ for $i,j \in [1, 2, \ldots, M]$ and $i \neq j$ is larger than the carrier wavelength then $CA \approx \delta^2_A I_M$ and then $$C_s \approx \frac{\sigma_A^2 T^2}{M^2} I_M = \frac{\rho}{M^2} I_M \qquad (37)$$

$C_s$ is therefore available based on the assumption of the Rayleigh fading model and on the approximate estimate of the physical distance between the M spatial sampling points. The performance of the synthetic array is typically robust in terms of errors in these estimated distances. $C_w$ is based on the modeling of the noise which is typically construed as being spatially white. Assuming that $C_s$ and $C_w$ are available, the PDF's of x conditioned on $H_0$ and $H_1$ can be written as $$p(x|H_1) = \frac{1}{\sqrt{|2\pi(C_s + C_w)|}} \exp[-x^H((C_s + C_w))^{-1}x] \qquad (38)$$

$$p(x|H_0) = \frac{1}{\sqrt{|2\pi C_w|}} \exp[-x^H C_w^{-1} x]$$

After some manipulation, and removing deterministic scaling and additive constants the LRT reduces to the estimator-correlator (EC) formulation resulting in a single sufficient statistic given as $$z_1 = x^H C_s (C_s + I)^{-1} x \qquad (39)$$

Figure 5:
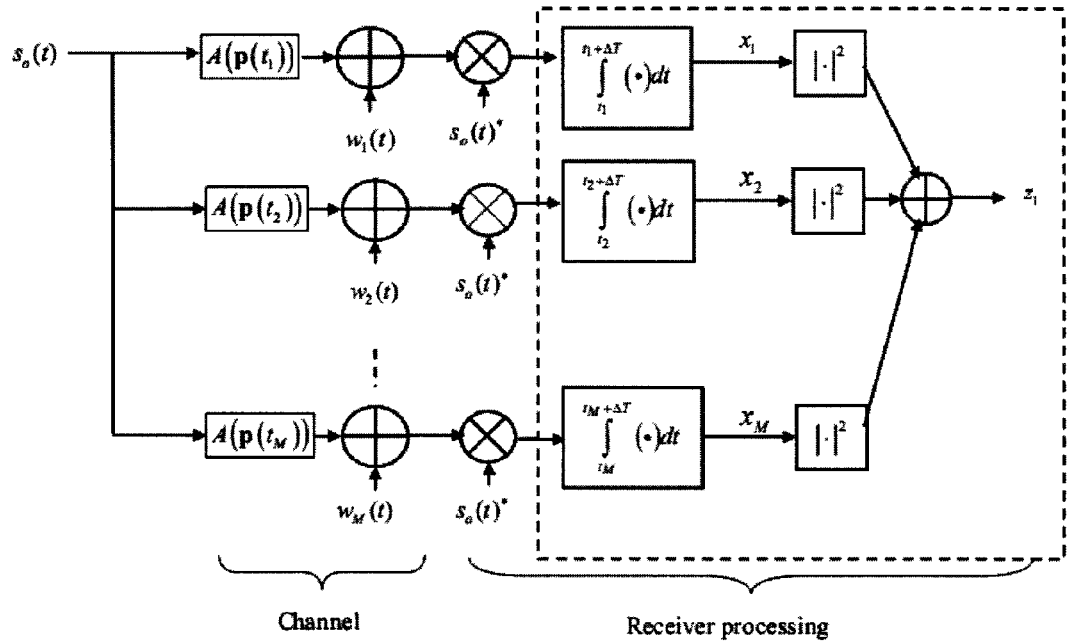
FIG. 5 illustrates the channel model used in one aspect of the invention as well as the subsequent Equal Gain combiner processing.

In the case that equation (37) is valid, implying that both the signal and noise are spatially white, then $z_1$ can be expressed as $$z_1 = x^H x > \gamma \qquad (40)$$

where the scaling coefficient of $$\frac{\rho}{M^2} / \left(\frac{\rho}{M^2} + 1\right)$$

has been ignored. Therefore, the optimum detection variable becomes $$Z_1 = \sum_{m=1}^{M} |x_m|^2 \qquad (41)$$

which is normally referred to as the Equal-Gain (EG) combiner. The channel model and subsequent EG processing is shown in FIG. 5.

The decision variable output of the equal gain combiner, $z_1$ has a PDF that is Chi-Squared central with 2M DOF under both $H_0$ and $H_1$. If the variance per DOF is taken as $\delta^2$ then the PDF of test statistics becomes $$f_z(z) = \frac{1}{\sigma^{2M} 2^M \Gamma(M)} z^{M-1} e^{-\frac{z}{2\sigma^2}} \qquad (42)$$

where $\Gamma(M)$ is the Gamma function and for integer M, $\Gamma(M) = (M-1)!$.

The PDF of z conditioned on $H_0$ and the assumption of spatial white channel noise as in (12) with $$\sigma^2 = \frac{1}{2M}$$

is given as $$f_z(z|H_0) = \frac{2^M M^M}{2^M \Gamma(M)} z^{M-1} e^{-\frac{z 2M}{2}} \qquad (43)$$

which simplifies to $$f_z(z|H_0) = \frac{M^M}{\Gamma(M)} z^{M-1} e^{-zM} \qquad (44)$$

For $H_1$, $$\sigma^2 = \frac{\rho}{2M^2} + \frac{1}{2M} = \frac{1}{2M}\left(\frac{\rho}{M} + 1\right) \qquad (45)$$

such that $$f_z(z|H_i) = \frac{2^M M^M}{\left(\frac{\rho}{M} + 1\right)^M 2^M \Gamma(M)} z^{M-1} e^{-\frac{zM}{\left(\frac{\rho}{M} - 1\right)}}$$

The $P_{FA}$ and $P_D$ can be determined for a threshold $\gamma$ as $$P_{FA} = Q_{\chi^2_{2M}}(2M\gamma) \qquad (46)$$

and $$P_D = Q_{\chi^2_{2M}}\left(\frac{2M\gamma}{\frac{\rho}{M} + 1}\right) \qquad (47)$$

where $$Q_{\chi^2_{2M}}(v) = \exp\left(-\frac{1}{2}v\right) \sum_{k=0}^{M-1} \frac{(0.5v)^k}{k!} \qquad (48)$$

The threshold can be scaled to simplify these expression to $$P_{FA} = Q_{\chi^2_{2M}}(\gamma) \qquad (49)$$

and $$P_D = Q_{\chi^2_{2M}}\left(\frac{\gamma}{\frac{\rho}{M} + 1}\right) \qquad (50)$$

The target detection parameter $P_{FA}$ is used in (49) to determine the threshold $\gamma$. This is used in (50) with the target parameter $P_D$ to determine the average SNR, $\rho$, required. Let $\rho_m$ denote the average SNR required for the moving antenna assuming the EG combining.

When implementing the system of the invention, it should be noted that there are a few things to keep in mind. As mentioned above, the optimum processing for correlated environment based on the Likelihood Ratio Test (LRT) with a Gaussian signal model results in the Estimator-Correlator (EC) formulation. This formulation is completely defined by $C_s$ and $C_w$ in equation (39), the signal and noise covariance matrices given by (35) and (12), respectively. In the Rayleigh fading channel, which is modeled by ring of scatterers, the signal covariance matrix is defined by (36). Hence, the $C_s$ depends only on pair wise distance between spatial sampling points, denoted here as $\Delta D$, which is determined by the approximate velocity and time interval between samples. Thus, no matter the array shape and configuration, as long as any pairs of spatial samples have a spacing more than approximately half of the wavelength (based on the signal covariance matrix model), the results of the above are satisfied.

Hence, the present invention is applicable to arbitrary geometry synthetic array with uniform and non-uniform spacing. This resolves the problem of precise trajectory estimation and array calibration, which are practical implementation difficulties associated with beamforming techniques. However, in practice it is advisable that the receiver acquire a rough estimate of the motion velocity so that it can reject highly correlated samples due to insufficient spatial separation. This can be accomplished by implementing consumer grade accelerometer devices which only need to estimate the spatial distance between samples by integrating the acceleration measurements twice.

Regarding the choice between the EC formulation and the EG combiner, the EG combiner represented here is an optimum approach for detecting a narrowband signal in an uncorrelated Rayleigh fading channel as it provides diversity gain over the static antenna with coherent integration processing. Although the EG combiner is not an optimal scheme to detect a random Gaussian signal in Gaussian noise in correlated signal environments, it has numerous implementation advantages and has been implemented in many practical receivers. It should be noted that the performances of EG and optimal combiners are almost identical for moderate channel correlation coefficients. On the other hand, as mentioned above, the EG combiner is an optimal approach for Gaussian signal detection in uncorrelated multipath environments.

The present invention incorporates by reference the following documents:

Broumandan, (2010), Enhanced Narrowband Signal Detection and Estimation with a Synthetic Antenna Array for Location Applications, PhD Thesis, University of Calgary.

Broumandan, A., J. Nielsen, and G. Lachapelle (2010) "Enhanced Detection Performance of Indoor GNSS Signals based on Synthetic Aperture," IEEE Transaction on Vehicular Technology, VOL. 59, NO. 6, July.

Broumandan, A., J. Nielsen, and G. Lachapelle (2010) "Signal Detection Performance in Rayleigh Multipath Fading Environments with a Moving Antenna," IET Signal Processing, 2010, Vol. 4, Iss. 2, pp. 117-129.

Broumandan, A., J. Nielsen, and G. Lachapelle (2010) "Indoor GNSS Signal Acquisition Performance Using a Synthetic Antenna Array," IEEE Transactions on Aerospace and Electronic Systems, in press.

It should be noted that any useful data processing means may be used with the invention. As such, ASICs, general purpose CPUs, and other data processing devices may be used, either as dedicated processors for the calculations or as general purpose processors for a device incorporating the invention. The invention may be used to enhance currently existing parameter estimation hardware or software as the invention seeks to provide statistical variety to the samples used for parameter estimation.

The method steps of the invention may be embodied in sets of executable machine code stored in a variety of formats such as object code or source code. Such code is described generically herein as programming code, or a computer program for simplification. Clearly, the executable machine code may be integrated with the code of other programs, implemented as subroutines, by external program calls or by other techniques as known in the art.

The embodiments of the invention may be executed by a computer processor or similar device programmed in the manner of method steps, or may be executed by an electronic system which is provided with means for executing these steps. Similarly, an electronic memory means such computer diskettes, CD-Roms, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language For example, preferred embodiments may be implemented in a procedural programming language (e.g."C") or an object oriented language (e.g."C++"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for determining a presence or absence of an incoming wireless signal, the system comprising:
   a single antenna
      a clock for providing a clock signal
      data processing means wherein
said single antenna is spatially and physically translated in space in an arbitrary trajectory
said data processing means samples data from said incoming signal at intervals based on said clock signal as said single antenna is spatially and physically translated through said arbitrary trajectory
said data processing means determines a presence or an absence of said incoming signal based on said samples.

2. A system according to claim 1 further including at least one sensor for determining data related to said arbitrary trajectory.

3. A system according to claim 2 wherein said at least one sensor provides data for estimating a velocity of said single antenna as said single antenna traverses said trajectory.

4. A system according to claim 1 wherein signal samples taken by said system are processed using an Equal Gain (EG) combiner to determine said presence or absence of said incoming signal.

5. A system according to claim 4 wherein said system is used in an uncorrelated multipath environment.

6. A system according to claim 1 wherein signal samples taken by said system are processed using an Estimator-Correlator (EC) formulation to determine said presence or absence of said incoming signal.

7. A system according to claim 6 wherein said system is used in a correlated multipath environment.

8. A method for detecting an incoming wireless signal, the method comprising:
determining an environment in which a signal detection system is to operate in
in the event said environment is an uncorrelated multipath environment, processing signal samples of said incoming signal using an Equal Gain (EG) combiner
in the event said environment is a correlated signal environment, processing signal samples of said incoming signal using an Estimator-Correlator (EC) formulation
wherein said system comprises
a single antenna
a clock for providing a clock signal
data processing means
wherein
said single antenna is spatially and physically translated in space in an arbitrary trajectory
said data processing means samples data from said incoming signal at intervals based on said clock signal as said single antenna is spatially and physically translated through said arbitrary trajectory
said data processing means determines a presence or an absence of said incoming signal based on said samples.

9. A method according to claim 8 wherein said system further includes at least one sensor for determining data related to said arbitrary trajectory.

* * * * *